(12) United States Patent
Liu

(10) Patent No.: US 6,582,558 B1
(45) Date of Patent: Jun. 24, 2003

(54) SOFT ABSORBENT TISSUE CONTAINING HYDROPHILIC POLYSILOXANES

(75) Inventor: Kou-Chang Liu, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/003,205

(22) Filed: Nov. 15, 2001

(51) Int. Cl.$^7$ .............................................. D21H 21/22
(52) U.S. Cl. ..................... 162/164.4; 162/109; 162/135
(58) Field of Search ................................ 162/109, 111, 162/112, 158, 164.4; 427/387, 391

(56) References Cited

U.S. PATENT DOCUMENTS

| | | |
|---|---|---|
| 4,409,267 A | 10/1983 | Ichinohe et al. |
| 4,614,675 A | 9/1986 | Ona et al. |
| 4,938,832 A | 7/1990 | Schmalz |
| 4,963,432 A | 10/1990 | Fuggini et al. |
| 5,059,282 A | 10/1991 | Ampulski et al. |
| 5,078,747 A | 1/1992 | Kästele et al. |
| 5,098,979 A | 3/1992 | O'Lenick, Jr. |
| 5,164,046 A | 11/1992 | Ampulski et al. |
| 5,215,626 A | 6/1993 | Ampulski et al. |
| 5,227,242 A | 7/1993 | Walter et al. |
| 5,246,546 A | 9/1993 | Ampulski |
| 5,281,658 A | 1/1994 | Ona et al. |
| 5,385,643 A | 1/1995 | Ampulski |
| 5,389,204 A | 2/1995 | Ampulski |
| 5,399,612 A | 3/1995 | Calhoun |
| 5,409,620 A | 4/1995 | Kosal et al. |
| 5,518,775 A | 5/1996 | Kosal et al. |
| 5,538,595 A | 7/1996 | Trokhan et al. |
| 5,552,020 A | 9/1996 | Smith et al. |
| 5,567,347 A | 10/1996 | Kosal et al. |
| 5,573,637 A | 11/1996 | Ampulski et al. |
| 5,575,891 A | 11/1996 | Trokhan et al. |
| 5,612,409 A | 3/1997 | Chrobaczek et al. |
| 5,629,088 A | 5/1997 | Ogawa et al. |
| RE35,621 E | 10/1997 | Schmalz |
| 5,707,434 A | 1/1998 | Halloran et al. |
| 5,707,435 A | 1/1998 | Halloran |
| 5,716,704 A | 2/1998 | Ogawa et al. |
| 5,725,736 A | 3/1998 | Schroeder et al. |
| 5,807,956 A | 9/1998 | Czech |
| 5,814,188 A | 9/1998 | Vinson et al. |
| 5,925,469 A | 7/1999 | Gee |
| 5,944,273 A | 8/1999 | Lin et al. |
| 5,981,681 A | 11/1999 | Czech |
| 6,017,417 A | 1/2000 | Wendt et al. |
| 6,030,675 A | 2/2000 | Schroeder et al. |
| 6,048,479 A | 4/2000 | Hashemzadeh |
| 6,054,020 A | 4/2000 | Goulet et al. |
| 6,072,017 A | 6/2000 | Blizzard et al. |
| 6,080,686 A | 6/2000 | Floyd |
| 6,136,215 A | 10/2000 | Evans et al. |
| 6,171,515 B1 | 1/2001 | Evans et al. |
| 6,180,234 B1 | 1/2001 | Hashemzadeh |
| 6,267,842 B1 | 7/2001 | Ona et al. |
| 6,432,270 B1 | 8/2002 | Liu et al. |
| 2001/0037100 A1 | 11/2001 | Shanklin |

FOREIGN PATENT DOCUMENTS

| | | |
|---|---|---|
| CA | 2202737 A1 | 10/1997 |
| EP | 0 347 154 B1 | 1/1996 |
| EP | 0 803 012 B1 | 6/1999 |
| EP | 0 938 886 A2 | 9/1999 |
| WO | WO 92/04409 A1 | 3/1992 |
| WO | WO 97/06306 A1 | 2/1997 |
| WO | WO 00/50098 A1 | 8/2000 |
| WO | WO 01/48312 A1 | 7/2001 |

OTHER PUBLICATIONS

Derwent World Patent Database abstract of Toray Dow Corning Silicone Co. Ltd.: Description of JP 63–023976 A2, "Treating Agent for Solid Material."

Derwent World Patent Database abstract of Toray Dow Corning Silicone Co. Ltd.: Description of JP 06–311943 A2, "Silicone Emulsion Composition for Treatment of Wiping Paper."

Derwent World Patent Database abstract of Toray Dow Corning Silicone Co. Ltd.: Description of JP 07–145596 A2, "Composition for Treating Wiping Paper."

Derwent World Patent Database abstract of Toray Dow Corning Silicone Co. Ltd.: Description of JP 2000–154495, "Water–Based Treating Agent for Wiping Off Paper."

*Primary Examiner*—Peter Chin
(74) *Attorney, Agent, or Firm*—Gregory E. Croft (57) ABSTRACT

A tissue product having improved hand feel and good wettability is produced by printing onto one or both sides of the tissue an aqueous emulsion containing a hydrophilically-modified amino-functional polysiloxane.

34 Claims, 2 Drawing Sheets

SOFT ABSORBENT TISSUE CONTAINING HYDROPHILIC POLYSILOXANES

BACKGROUND OF THE INVENTION

In the field of soft tissues, such as facial tissue and bath tissue, it is well known that the application of polysiloxanes to the surface of the tissue can impart an improved surface feel to the tissue. However, polysiloxanes are also known to impart hydrophobicity to the treated tissue. Hence, it is difficult to find a proper balance between softness and wettability, both of which are desirable attributes for tissue, particularly bath tissue.

SUMMARY OF THE INVENTION

It has now been discovered that the wettability of a tissue can be improved with minimal negative impact on the surface feel of the tissue by treating one or both outer surfaces of the tissue with a particular group of hydrophilically-modified amino-functional polydimethylsiloxanes. More specifically, suitable polysiloxane structures have one or more pendant groups and/or one or both terminal groups which contain an amine derivative. A general structure is as follows:

wherein:

m=1–10,000;

n=10–100,000;

"X" is selected from the group consisting of hydroxy; $C_1$–$C_{20}$ alkoxy, $C_1$–$C_{24}$ alkyl radical, which can be straight chain, branched or cyclic, unsubstituted or substituted;

$R_1$=a $C_1$–$C_6$ alkyl radical, which can be straight chain, branched or cyclic; and wherein t=0 or 1;

w=0 or 1;

$R_2$=a $C_2$–$C_{10}$ alkylene diradical, which can be straight chain or branched, substituted or unsubstituted;

$R_3$=a $C_2$–$C_{10}$ alkylene diradical, which can be straight chain or branched, substituted or unsubstituted;

$R_4$=hydrogen or a $C_1$–$C_{10}$ alkyl radical, which can be straight chain, branched or cyclic, substituted or unsubstituted or a —$COR_6COOL$, or —$COR_6COOR_7$ radical;

$R_5$=a hydrogen, a $C_1$–$C_{10}$ alkyl radical, which can be straight chain or branched, substituted or unsubstituted or a —$COR_6COOL$, or —$COR_6COOR_7$ radical, or a "Y";

such that when t=1, "Y"=a —$COR_6COOL$ radical or a —$COR_6$—$COOR_7$ radical;

such that when t=0, "Y"=a $COR_6CO$ diradical, a $COR_6$ diradical, or a —$CONR_7R_6CO$ diradical, wherein $R_6$ is a $C_2$–$C_8$ alkylene diradical, substituted or unsubstituted;

$R_7$ is a hydrogen, $C_1$–$C_{30}$ alkyl radical, substituted or unsubstituted; and L=a hydrogen, sodium, potassium, calcium or other ion;

such that when X=G, Y can also be a $COR_8$, wherein $R_8$ is a $C_1$–$C_{30}$ alkyl radical, substituted or unsubstituted.

Representative species within the foregoing general structure include the following:

(1)

(2)

(3)

(4)

(5)

(6)

(7)

(8)

(9)

-continued (10)

The hydrophilically-modified amino-functional polydimethylsiloxanes described above can be applied to the tissue web alone or in conjunction with other chemicals, such as bonders or debonders. They can be applied to the tissue web, particularly an uncreped throughdried web, by spraying or printing. Rotogravure printing of solution or an aqueous emulsion is particularly effective. Add-on amounts can be from about 0.5 to about 15 dry weight percent, based on the weight of the tissue, more specifically from about 1 to about 10 dry weight percent, still more specifically from about 1 to about 5 weight percent, still more specifically from about 2 to about 5 weight percent. The distribution of the deposits of the hydrophilically-modified amino-functional polydimethylsiloxanes is substantially uniform over the printed surface of the tissue, even though the surface of the tissue, such as in the case of uncreped throughdried tissues, may be highly textured and three-dimensional.

The Wet Out Time (hereinafter defined) for tissues of this invention can be about 10 seconds or less, more specifically about 8 seconds or less, still more specifically about 6 seconds or less, still more specifically about 5 seconds or less, still more specifically from about 4 to about 6 seconds. As used herein, "Wet Out Time" is related to absorbency and is the time it takes for a given sample to completely wet out when placed in water. More specifically, the Wet Out Time is determined by cutting 20 sheets of the tissue sample into 2.5 inch squares. The number of sheets used in the test is independent of the number of plies per sheet of product. The 20 square sheets are stacked together and stapled at each corner to form a pad. The pad is held close to the surface of a constant temperature distilled water bath (23+/−2° C.), which is the appropriate size and depth to ensure the saturated specimen does not contact the bottom of the container and the top surface of the water at the same time, and dropped flat onto the water surface, staple points down. The time taken for the pad to become completely saturated, measured in seconds, is the Wet Out Time for the sample and represents the absorbent rate of the tissue. Increases in the Wet Out Time represent a decrease in absorbent rate.

The "Differential Wet Out Time" is the difference between the Wet Out Times of a tissue sample treated with a hydrophilically-modified amino-functional polydimethylsiloxane and a control tissue sample which has not been treated. The Differential Wet Out Time, for purposes of this invention, can be about 5 seconds or less, more specifically about 4 seconds or less, still more specifically about 3 seconds or less, still more specifically about 2 seconds or less, and still more specifically about 1 second or less.

The ratio of the Differential Wet Out Time to the add-on amount of the hydrophilically-modified amino-functional polydimethylsiloxane can be about 2 seconds per weight percent or less, more specifically about 1 second per weight percent or less, still more specifically about 0.5 second per weight percent or less.

Tissue sheets useful for purposes of this invention can be creped or uncreped. Such tissue sheets can be used for facial tissues, bath tissues or towels. They can have one, two, three or more plies. The basis weight of the tissue product can be from about 25 to about 50 grams per square meter. If used for bath tissue, a single ply tissue having a basis weight of from about 30–40 grams per square meter is particularly suitable.

DETAILED DESCRIPTION OF THE DRAWINGS

Figure 1:
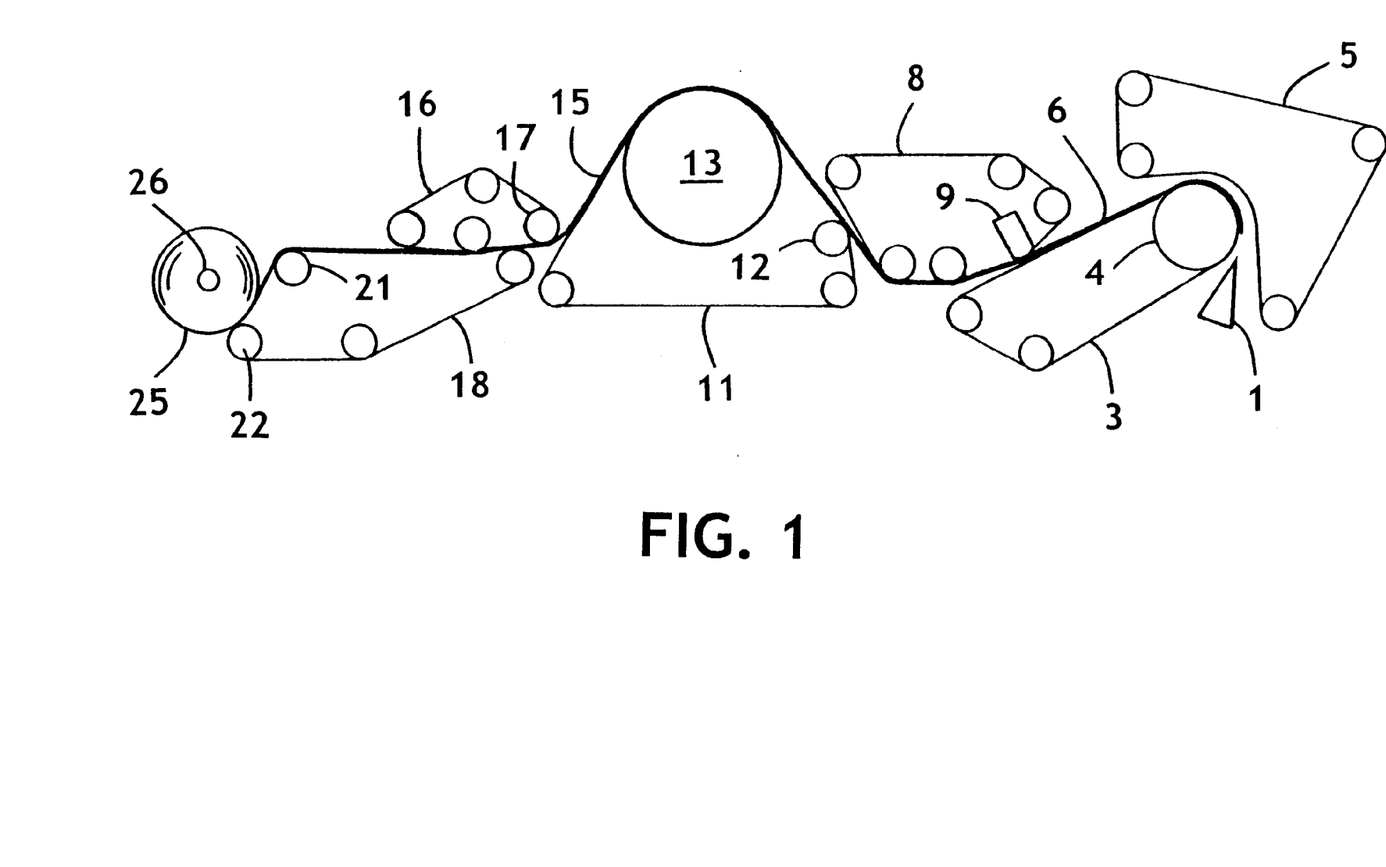
FIG. 1 is a schematic diagram of an uncreped throughdried process for making bath tissue in accordance with this invention.

Referring to FIG. 1, shown is a schematic flow diagram of a throughdrying process for making uncreped throughdried tissue sheets. Shown is the headbox 1 which deposits an aqueous suspension of papermaking fibers onto an inner forming fabric 3 as it traverses the forming roll 4. Outer forming fabric 5 serves to contain the web while it passes over the forming roll and sheds some of the water. The wet web 6 is then transferred from the inner forming fabric to a wet end transfer fabric 8 with the aid of a vacuum transfer shoe 9. This transfer is preferably carried out with the transfer fabric traveling at a slower speed than the forming fabric (rush transfer) to impart stretch into the final tissue sheet. The wet web is then transferred to the throughdrying fabric 11 with the assistance of a vacuum transfer roll 12. The throughdrying fabric carries the web over the throughdryer 13, which blows hot air through the web to dry it while preserving bulk. There can be more than one throughdryer in series (not shown), depending on the speed and the dryer capacity. The dried tissue sheet 15 is then transferred to a first dry end transfer fabric 16 with the aid of vacuum transfer roll 17. The tissue sheet shortly after transfer is sandwiched between the first dry end transfer fabric and the transfer belt 18 to positively control the sheet path. The air permeability of the transfer belt is lower than that of the first dry end transfer fabric, causing the sheet to naturally adhere to the transfer belt. At the point of separation, the sheet follows the transfer belt due to vacuum action. Suitable low air permeability fabrics for use as transfer belts include, without limitation, COFPA Mononap NP 50 dryer felt (air permeability of about 50 cubic feet per minute per square foot) and Asten 960C (impermeable to air). The transfer belt passes over two winding drums 21 and 22 before returning to pick up the dried tissue sheet again. The sheet is transferred to the parent roll 25 at a point between the two winding drums. The parent roll is wound onto a reel spool 26, which is driven by a center drive motor.

Particularly suitable methods of producing uncreped throughdried basesheets for purposes of this invention are described in U.S. Pat. No. 6,017,417 issued Jan. 25, 2000 to Wendt et al. and U.S. Pat. No. 5,944,273 issued Aug. 31, 1999 to Lin et al., both of which are herein incorporated by reference.

Figure 2:
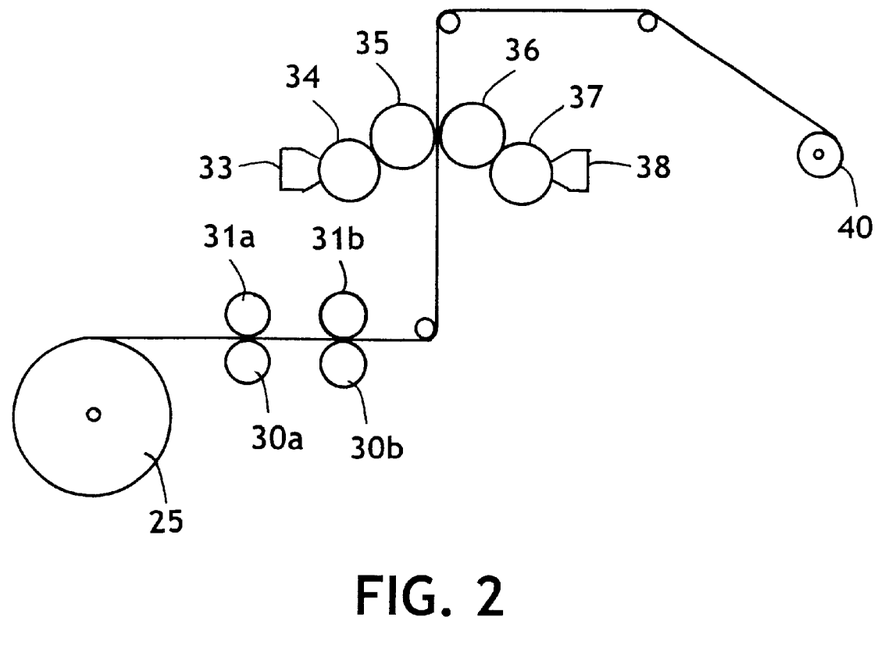
FIG. 2 is a schematic diagram of the post-manufacturing method of handling the uncreped throughdried web and the rotogravure coating process used to apply the hydrophilically-modified amino-functional polydimethylsiloxane solution or emulsion in accordance with this invention.

FIG. 2 illustrates a suitable method for applying the hydrophilically-modified amino-functional polydimethylsiloxane to the tissue basesheet. Shown is the parent roll 25 being unwound and passed through two calender nips between calender rolls 30a and 31a and 30b and 31b. The calendered web is then passed to the rotogravure coating station comprising a first closed doctor chamber 33 containing the hydrophilically-modified amino-functional polydimethylsiloxane solution or emulsion to be applied to a first side of the web, a first engraved steel gravure roll 34, a first rubber backing roll 35, a second rubber backing roll 36, a second engraved steel gravure roll 37 and a second closed doctor chamber 38 containing the hydrophilically-modified amino-functional polydimethylsiloxane solution or emulsion to be applied to the second side of the web. If both sides of the web are to be treated, the two solutions or emulsions can be the same or different. The calendered web passes through a fixed-gap nip between the two rubber backing rolls where the hydrophilically-modified amino-functional polydimethylsiloxane solution or emulsion is applied to the web. The treated web is then passed to the rewinder where the web is wound onto logs 40 and slit into rolls of bath tissue.

EXAMPLES

Examples 1–6

In order to further illustrate the materials of this invention, the syntheses of a number of representative polysiloxanes in accordance with this invention are described below. Some of the chemical structures of the various starting materials are set forth below and identified by a letter, which letter is used in the description of the appropriate example.

(A)

(H)

(I)

(J)

(K)

Example 1

Two moles of chemical "A" with n=5 is condensed with 1 mole of chemical "B" in the presence of a base catalyst, in a glass-lined reactor, to yield the intermediate amino-functionalized dimethylpolysiloxane "F". When the viscosity of the polysiloxane "F" reaches 3,000 cps, the condensation reaction is terminated.

One mole of succinic anhydride is added portionwise to polymer "F" with vigorous stirring. After the completion of the addition, the mixture is heated to 80° C., held for 8 hrs with good mixing. The polymer obtained has the structure (1).

Example 2

Polymer (1) obtained from Example 1 is further heated to 150° C. and held for 5 hrs to form the succinimide derivitized dimethylpolysiloxane having structure (2).

Example 3

One mole of chemical "A" with n=60 is condensed with 1 mole of chemical "B" and 0.02 mole of chemical "C" in the presence of a base catalyst, in a reactor, to yield the intermediate amino-functionalized dimethylpolysiloxane "F".

Butyrolactone (1.02 moles) is added portionwise to polymer "F" with vigorous stirring. After the completion of the addition, the fluid is heated to 200° C. under a reduced pressure with good mixing. After 1.02 moles of water being removed from the reactor, a polysiloxane having structure (3) is obtained. The reactor is cooled to room temperature and the product is discharged.

Example 4

One mole of chemical "A" with n=40 is condensed with 1 mole of chemical "D" in the presence of a base catalyst, in a glass-lined reactor, to yield the intermediate amino-functionalized dimethylpolysiloxane "G".

Two moles of succinic anhydride are added portionwise to polymer "G" with vigorous stirring. After the completion of the addition, the mixture is heated to 80° C., held for 8 hrs with good mixing. The polymer obtained has the structure of chemical (4).

Example 5

Polymer (4) obtained from Example 4 is further heated to 150° C. and held for 5 hrs to form the succinimide derivitized dimethylpolysiloxane (structure(5)).

Example 6

One mole of chemical "A" with n=40 is condensed with 4 moles of chemical B in the presence of a base catalyst, in a glass-lined reactor, to yield the intermediate amino-functionalized dimethylpolysiloxane "E". When the viscosity of the polysiloxane "E" reaches 10,000 cps, the condensation reaction is terminated.

Four moles of succinic anhydride are added portionwise to polymer "E" with vigorous stirring. After the completion of the addition, the mixture is heated to 80° C., held for 8 hrs with good mixing. The polymer obtained has the structure (1).

Example 7

Polymer (1) obtained from Example 6 is further heated to 150° C. and held for 5 hrs to form the succinimide derivitized dimethylpolysiloxane (structure (2)).

Example 8

Two moles of chemical "A" with n=20 is condensed with one mole of chemical "B" in the presence of a base catalyst, in a glass-lined reactor, to yield the intermediate amino-functionalized dimethylpolysiloxane "E". When the viscosity of the polysiloxane "E" reaches 5,000 cps, the condensation reaction is terminated.

One mole of maleic anhydride is added portionwise to polymer "E" with vigorous stirring. After the completion of the addition, the mixture is heated to 80° C., held for 8 hrs. with good mixing. The polymer obtained has the structure (8).

Example 9

Polymer (8) obtained from Example 8 is further heated to 150° C. and held for 5 hrs. to form the maleimide derivitized dimethylpolysiloxane (structure (9)).

Example 10

One mole of chemical "B" is charged into a reactor. The temperature of the reactor is brought to between 80° C. and 100° C. One mole of succinic anhydride is added in portions. After all the succinic anhydride is added the temperature of the reactor is raised to between 130° C. and 160° C. and held for 6 hrs. under reduced pressure. Product "H" is formed.

The reactor is then cooled to about 50° C. and one mole of chemical "A" with n=20, and 0.01 mole of a basic catalyst is added. The methanol and water generated is condensed into a chemical recovery container. The resulting polysiloxane is structure (2). The condensation reaction is terminated when the viscosity of the polymer reaches 10,000 cps. The product is cooled to room temperature and discharged.

Example 11

One mole of chemical "A" win n=20 is condensed with 0.8 mole of chemical "I" and 0.2 mole of chemical "J" in the presence of a base catalyst, in a reactor with vigorous stirring. After about 1 mole of water being removed from the reactor, polysiloxane having the structure (3) is obtained. The reactor is cooled to room temperature and the product is discharged.

Example 12

Two moles of chemical "A" with n=30 are condensed with 1 mole of chemical "K" and 0.1 mole of chemical "J" in the presence of a base catalyst in a reactor. When the viscosity of the reaction fluid reaches 50,000 cps, the condensation reaction is terminated and polysiloxane having the structure (11) is formed.

Example 13

In order to further illustrate this invention, an uncreped throughdried tissue was produced using the methods described in FIGS. 1 and 2 and treated with a hydrophilically-modified amino-functional polydimethylsiloxane (Kelmar EXP-KC-10521-11) provided by Kelmar Industries.

More specifically, a single-ply, three-layered uncreped throughdried bath tissue was made using eucalyptus fibers for the outer layers and softwood fibers for the inner layer. Prior to pulping, a quaternary ammonium softening agent (C-6027 from Goldschmidt Corp.) was added at a dosage of 4.1 kg/Mton of active chemical per metric ton of fiber to the eucalyptus furnish. After allowing 20 minutes of mixing time, the slurry was dewatered using a belt press to approximately 32% consistency. The filtrate from the dewatering process was either sewered or used as pulper make-up water for subsequent fiber batches but not sent forward in the stock preparation or tissuemaking process. The thickened pulp containing the debonder was subsequently re-dispersed in water and used as the outer layer furnishes in the tissuemaking process.

The softwood fibers were pulped for 30 minutes at 4 percent consistency and diluted to 3.2 percent consistency after pulping, while the debonded eucalyptus fibers were diluted to 2 percent consistency. The overall layered sheet weight was split 30%/40%/30% among the eucalyptus/refined softwood/eucalyptus layers. The center layer was refined to levels required to achieve target strength values, while the outer layers provided the surface softness and bulk. Parez 631NC was added to the center layer at 2–4 kilograms per tonne of pulp based on the center layer.

A three layer headbox was used to form the wet web with the refined northern softwood kraft stock in the two center layers of the headbox to produce a single center layer for the three-layered product described. Turbulence-generating inserts recessed about 3 inches (75 millimeters) from the slice and layer dividers extending about 1 inch (25.4 millimeters) beyond the slice were employed. The net slice opening was about 0.9 inch (23 millimeters) and water flows in all four headbox layers were comparable. The consistency of the stock fed to the headbox was about 0.09 weight percent.

The resulting three-layered sheet was formed on a twin-wire, suction form roll, former with the two forming fabrics being a Lindsay 2164 and an Asten 867a fabric. The speed of the forming fabrics was 11.9 meters per second. The newly-formed web was then dewatered to a consistency of about 20–27 percent using vacuum suction from below the forming fabric before being transferred to the transfer fabric, which was travelling at 9.1 meters per second (30% rush transfer). The transfer fabric was an Appleton Wire T807-1. A vacuum shoe pulling about 6–15 inches (150–380 millimeters) of mercury vacuum was used to transfer the web to the transfer fabric.

The web was then transferred to a throughdrying fabric (Lindsay Wire T1205-1). The throughdrying fabric was travelling at a speed of about 9.1 meters per second. The web was carried over a Honeycomb throughdryer operating at a temperature of about 350° F. (175° C.) and dried to final dryness of about 94–98 percent consistency. The resulting uncreped tissue sheet was then wound into a parent roll.

The parent roll was then unwound and the web was calendered twice. At the first station the web was calendered between a steel roll and a rubber covered roll having a 4 P&J hardness. The calender loading was about 90 pounds per lineal inch (pli). At the second calendering station, the web was calendered between a steel roll and a rubber covered roll having a 40 P&J hardness. The calender loading was about 140 pli. The thickness of the rubber covers was about 0.725 inch (1.84 centimeters).

The calendered single-ply web was then fed into the rubber-rubber nip of the rotogravure coater to apply the hydrophilically-modified amino-functional polydimethylsiloxane solution to both sides of the web. The aqueous solution contained 25% hydrophilic polydimethylsiloxane (W-1), 0.75% antifoaming agent, 0.5% preservative, and the balance water. The gravure rolls were electronically engraved, chrome over copper rolls supplied by Specialty Systems, Inc., Louisville, Ky. The rolls had a line screen of 200 cells per lineal inch and a volume of 6.0 Billion Cubic Microns (BCM) per square inch of roll surface. Typical cell dimensions for this roll were 140 microns in width and 33 microns in depth using a 130 degree engraving stylus. The rubber backing offset applicator rolls were a 75 Shore A durometer cast polyurethane supplied by American Roller Company, Union Grove, Wis. The process was set up to a condition having 0.375 inch interference between the gravure rolls and the rubber backing rolls and 0.003 inch clearance between the facing rubber backing rolls. The simultaneous offset/offset gravure printer was run at a speed of 2000 feet per minute using gravure roll speed adjustment (differential) to meter the polysiloxane solution to obtain the desired addition rate. The gravure roll speed differential used for this example was 1000 feet per minute. This process yielded an add-on level of 2.5 weight percent total add-on based on the weight of the tissue. The tissue was then converted into bath tissue rolls. Sheets from the bath tissue rolls had a silky, lotiony hand feel and a Wet Out Time of 6.0 seconds. The ratio of the Wet Out Time to the weight percent add-on amount was 0.8.

Example 14

An uncreped throughdried tissue was made substantially as described above with the following exceptions: (1) the overall layered weight is split 30%/40%/30% among the eucalyptus/refined softwood/eucalyptus layers; (2) no Parez was added to the center layer; (3) the add-on level of the hydrophilically-modified amino-functional polydimethylsiloxane was 2.5 weight percent; and (4) the hydrophilically-modified amino-functional polydimethylsiloxane constituted 25 weight percent of the aqueous emulsion used to deliver the hydrophilically-modified amino-functional polydimethylsiloxane to the tissue. The resulting bath tissue product obtained had a silky, lotiony hand feel and a Wet Out Time of 5.5 seconds.

Example 15

An uncreped throughdried tissue is made substantially as described above with the following exceptions: (1) the overall layered weight is split 30%/40%/30% among eucalyptus/refined softwood/eucalyptus layers; (2) no Parez is added to the center layer; (3) the add-on level of the hydrophilically-modified amino-functional polydimethylsiloxane is 3.0 weight percent; (4) the structure of the hydrophilically-modified amino-functional polydimethylsiloxane is as set forth in structure (1); and (5) the hydrophilically-modified amino-functional polydimethylsiloxane constitutes 30 weight percent of the aqueous emulsion used to deliver the hydrophilically-modified amino-functional polydimethylsiloxane to the tissue. The resulting bath tissue product obtained has a silky, lotiony hand feel and a Wet Out Time of 4.5 seconds.

Example 16

An uncreped throughdried tissue is made substantially as described above with the following exceptions: (1) the overall layered weight is split 30%/40%/30% among the eucalyptus/refined softwood/eucalyptus layers; (2) no Parez is added to the center layer; (3) the add-on level of the hydrophilically-modified amino-functional polydimethylsiloxane is 3.0 weight percent; (4) the structure of the hydrophilically-modified amino-functional polydimethylsiloxane is as set forth in structure (3); (5) the hydrophilically-modified amino-functional polydimethylsiloxane constitutes 30 weight percent of the aqueous emulsion used to deliver the hydrophilically-modified amino-functional polydimethylsiloxane to the tissue. The resulting bath tissue product obtained has a silky, lotiony hand feel and a Wet Out Time of 5.2 seconds.

It will be appreciated that the foregoing examples and discussion is for purposes of illustration only and is not to be construed as limiting the scope of this invention, which is defined by the following claims and all equivalents thereto.

I claim:

1. A tissue having a Wet Out Time of about 10 seconds or less and containing at least about 2 dry weight percent of a hydrophilically-modified amino-functional polysiloxane having the following structure:

wherein:

$m = 1-10,000$;

$n = 10-100,000$;

"X" is selected from the group consisting of hydroxy; $C_1-C_{20}$ alkoxy, $C_1-C_{24}$ alkyl radical, which can be straight chain, branched or cyclic, unsubstituted or substituted;

$R_1 = $ a $C_1-C_6$ alkyl radical, which can be straight chain, branched or cyclic; and wherein $t = 0$ or 1;

$w = 0$ or 1;

$R_2 = $ a $C_2-C_{10}$ alkylene diradical, which can be straight chain or branched, substituted or unsubstituted;

$R_3 = $ a $C_2-C_{10}$ alkylene diradical, which can be straight chain or branched, substituted or unsubstituted;

$R_4 = $ hydrogen or a $C_1-C_{10}$ alkyl radical, which can be straight chain, branched or cyclic, substituted or unsubstituted or a —$COR_6COOL$, or —$COR_6COOR_7$ radical;

$R_5 = $ a hydrogen, a $C_1-C_{10}$ alkyl radical, which can be straight chain or branched, substituted or unsubstituted or a —$COR_6COOL$, or —$COR_6COOR_7$ radical, or a "Y";

such that when $t=1$, "Y"= a —$COR_6COOL$ radical or a —$COR_6$—$COOR_7$ radical;

such that when $t=0$, "Y"= a $COR_6CO$ diradical, a $COR_6$ diradical, or a —$CONR_7R_6CO$ diradical, wherein $R_6$ is a $C_2-C_8$ alkylene diradical, substituted or unsubstituted;

$R_7$ is a hydrogen, $C_1-C_{30}$ alkyl radical, substituted or unsubstituted; and L = a hydrogen, sodium, potassium, calcium or other ion;

such that when X=G, Y can also be a $COR_8$, wherein $R_8$ is a $C_1-C_{30}$ alkyl radical, substituted or unsubstituted.

2. The tissue of claim 1 wherein the Wet Out Time is about 8 seconds or less.

3. The tissue of claim 1 wherein the Wet Out Time is about 6 seconds or less.

4. The tissue of claim 1 wherein the Wet Out Time is about 5 seconds or less.

5. The tissue of claim 1 wherein the Wet Out Time is from about 4 to about 6 seconds.

6. The tissue of claim 1 having from about 0.5 to about 15 dry weight percent of the hydrophilically-modified amino-functional polysiloxane.

7. The tissue of claim 1 having from about 1 to about 10 dry weight percent of the hydrophilically-modified amino-functional polysiloxane.

8. The tissue of claim 1 having from about 1 to about 5 dry weight percent of the hydrophilically-modified amino-functional polysiloxane.

9. The tissue of claim 1 having from about 2 to about 5 dry weight percent of the hydrophilically-modified amino-functional polysiloxane.

10. The tissue of claim 1 wherein the ratio of the Differential Wet Out Time to the add-on amount of the hydrophilically-modified amino-functional polysiloxane is about 2 seconds per weight percent or less.

11. The tissue of claim 1 wherein the ratio of the Differential Wet Out Time to the add-on amount of the hydrophilically-modified amino-functional polysiloxane is about 1 second per weight percent or less.

12. The tissue of claim 1 wherein the ratio of the Differential Wet Out Time to the add-on amount of the hydrophilically-modified amino-functional polysiloxane is about 0.5 second per weight percent or less.

13. The tissue of claim 1 wherein the tissue is an uncreped throughdried tissue.

14. The tissue of claim 1 wherein both sides of the tissue are printed with the same hydrophilically-modified amino-functional polysiloxane.

15. The tissue of claim 1 wherein the hydrophilically-modified amino-functional polydimethylsiloxane printed on one side of the tissue is different than the hydrophilically-modified amino-functional polysiloxane printed on the other side of the tissue.

16. The tissue of claim 1 wherein X=G.

17. The tissue of claim 1 wherein X is a hydroxyl radical.

18. The tissue of claim 1 wherein Y is a —COR$_6$COOL radical.

19. The tissue of claim 1 wherein Y is a —COR$_6$COOR$_7$ radical.

20. The tissue of claim 1 wherein Y is a COR$_6$CO diradical.

21. The tissue of claim 1 wherein Y is a —COR$_6$ diradical.

22. The tissue of claim 1 wherein Y is a —CONR$_7$R$_6$CO diradical.

23. The tissue of claim 1 wherein X=G and Y=COR$_7$.

24. The tissue of claim 1 wherein the hydrophilically-modified amino-functional polysiloxane has the following structure:

25. The tissue of claim 1 wherein the hydrophilically-modified amino-functional polysiloxane has the following structure:

26. The tissue of claim 1 wherein the hydrophilically-modified amino-functional polysiloxane has the following structure:

27. The tissue of claim 1 wherein the hydrophilically-modified amino-functional polysiloxane has the following structure:

28. The tissue of claim 1 wherein the hydrophilically-modified amino-functional polysiloxane has the following structure:

29. The tissue of claim 1 wherein the hydrophilically-modified amino-functional polysiloxane has the following structure:

30. The tissue of claim 1 wherein the hydrophilically-modified amino-functional polysiloxane has the following structure:

31. The tissue of claim 1 wherein the hydrophilically-modified amino-functional polysiloxane has the following structure:

32. The tissue of claim 1 wherein the hydrophilically-modified amino-functional polysiloxane has the following structure:

33. The tissue of claim 1 wherein the hydrophilically-modified amino-functional polysiloxane has the following structure:

34. The tissue of claim 1 wherein the hydrophilically-modified amino-functional polysiloxane has the following structure:

* * * * *